Patented Mar. 11, 1941

2,234,186

UNITED STATES PATENT OFFICE 2,234,186

REVERSIBLE GEL COMPOSITION OF POLY-VINYL ALCOHOL AND THE SALT OF O-HYDROXY BENZAL AROMATIC KETONE AND ITS PREPARATION

Wendell H. McDowell and William O. Kenyon, Rochester, N. Y., assignors to Eastman Kodak Company, Rochester, N. Y., a corporation of New Jersey No Drawing. Application February 12, 1940, Serial No. 318,550. In Great Britain February 14, 1939

8 Claims. (Cl. 252—316)

The invention relates to the preparation of reversible gels by gelling polyvinyl alcohol with a water-soluble salt of an o-hydroxy benzal aromatic ketone and the reversible gels prepared therefrom.

The term "polyvinyl alcohol" as used herein is to be understood as referring to polymers in which at least 50% thereof is composed of vinyl alcohol constituent. It refers to polymers all of which is composed of vinyl alcohol units and also to polymers containing not only vinyl alcohol units but also vinyl acetate (and/or propionate and/or butyrate) units providing the vinyl alcohol units make up at least 50% of the polymer.

Ordinarily polyvinyl alcohol is a water-soluble material which does not shown the properties of a gel under ordinary conditions. Therefore, polyvinyl alcohol does not usually find use where continued contact with water is involved as it has no permanence in such a situation. One object of our invention is to treat polyvinyl alcohol with the alkali metal salt of an ortho-hydroxy benzal aromatic ketone so as to convert the polyvinyl alcohol into a rigid gel which has thermal-reversible properties. Another object of our invention is to prepare a product from polyvinyl alcohol which is both colored and has gel characteristics so that the color is intimately associated therewith and the product may be used instead of dyed gelatin or other like materials, which have been colored, for the various purposes in which those materials are used.

We have found that when polyvinyl alcohol is mixed with the required amount of an alkali metal salt of an ortho-hydroxy benzal aromatic ketone the polyvinyl alcohol forms a colored gel which is firm and strong. The color of the resulting gel depends upon which of this class of compounds has been used for the gelling agent. We have also found that the product so prepared is thermal-reversible, namely, the gel is converted to a liquid upon heating but again forms a gel upon cooling the liquid. This is true even though the gel has been subjected to a washing with water which would remove gelling agent which is not bound to or absorbed by the polyvinyl alcohol. If the gel is subjected to so much washing that some of the required gelling agent is removed, an additional amount of gelling agent may be added to the gel by warming and then allowing to set again or cooling. We have found that polyvinyl alcohol may be thus gelled whether it is prepared from a polyvinyl acetate of high, medium, or low viscosity. The gelling agent may be incorporated directly into an aqueous solution of the polyvinyl alcohol or it may be dissolved in water before adding thereto. Upon standing a polyvinyl alcohol gel is formed which can be redispersed upon heating.

The proportion of gelling agent employed may be varied depending upon the conditions of treatment. Using higher viscosity polyvinyl alcohol the proportion of gelling agent need not be as great as with the lower viscosity alcohols. As a general rule gelling may be induced with a lesser amount of gelling agent with the employment of lower temperatures. Other features which cause variation in the necessary proportion of gelling agent are the concentration of the solution of polyvinyl alcohol which is treated and the hardness or firmness desired for the gel to be obtained. Also, in some cases it may be desirable to get a product having a pronounced color and therefore sufficient gelling agent to assure strong coloration should be used. For instance, an aqueous solution of polyvinyl alcohol of 5.6% concentration was treated with the sodium salt of disalicylal acetone. When approximately 25% or more of this gelling agent (based on the weight of the polyvinyl alcohol) was used the mass was found to gel at 25° C. Using a lower temperature a lesser amount of gelling agent is required. As pointed out above, the gels of our invention are colored depending upon the gelling agent used. If the gelling agent is disalicylal acetone a violet color is obtained while with other compounds in this class, other colors such as reds and orange-reds result. As the name of the class implies the gelling agents used for the preparation of gels from polyvinyl alcohol in accordance with our invention should be the alkali metal salts of compounds having benzenoid groupings at both ends. Also there should be at least two benzenoid groupings in the compound and the only compounds which are effective are those having hydroxy groups in the ortho position of the benzal portion of the compound. If the "benzenoid" in the benzal portion of the compound is a naphthalene grouping, the hydroxy should be attached to the ring at a point adjacent to the point at which the benzal portion of the compound is linked.

To form a firm rigid gel with the gelling agents described herein at least 30% and preferably 50% or more (based on the weight of the polyvinyl alcohol) of those gelling agents should be employed on an aqueous solution of polyvinyl alcohol of 5.6% concentration by weight. The upper limit is not critical but for reasons of economy the use of not more than 200% is ordinarily preferred. The lower limit will vary depending on the concentration of the aqueous polyvinyl alcohol and on the viscosity of the alcohol.

The pH of the mass is not critical as the gelling operation will tolerate a considerable excess of alkali although a high excess of alkali is wasteful and introduces the problem of washing the alkali from the gel after the gelling action has occurred. Obviously, as the gelling agents are limited to the alkali metal salts, it is essential that the mass does not go to the acid side. The following examples illustrate the gelling of polyvinyl alcohol with the alkali metal salt of an ortho-hydroxy benzal aromatic ketone in accordance with our invention.

A 6% aqueous solution of polyvinyl alcohol having a molecular weight of 17,600 and a temperature of 50° C. was mixed with o-hydroxy benzal acetophenone dissolved in dilute alkali, the amount of gelling agent being dependent upon the temperature at which it was desired that a gel be obtained. The mass was allowed to cool to the temperature necessary to cause gelling. In this case the ortho-hydroxy benzal acetophenone used was one half the weight of the polyvinyl alcohol. The mass gelled well before a temperature of 25° C. was reached. The gell obtained was firm and rigid, red in color and coated well from the solution formed when the mass was warmed. Coatings of various color densities are obtainable by using polyvinyl alcohols of different molecular weights.

*Example II*

A 6% aqueous solution of polyvinyl alcohol was treated with an aqueous alkaline solution of ortho-hydroxy benzal ortho hydroxy acetophenone as described in the preceding example. A gel was obtained which was orange-red in color and showed reversible gelation with temperature change.

*Example III*

Crystals of the disodium salt of disalicylal acetone were added to a warm aqueous 6% solution of polyvinyl alcohol having a molecular weight of 17,600 until a sample would form a firm gel at room temperature. The mass was then cooled to room temperature and the gel was violet colored. Coatings were made by heating the gel to the point of liquefaction and then spreading on chilled plates. The cured films resulting were uniform in color and possessed good physical properties. For convenience of operation, the range of 3-7% for the concentration of polyvinyl in water is preferred for the polyvinyl alcohols usually used. These polyvinyl alcohols are ordinarily of a viscosity which gives a molecular weight of approximately 6700-19,800. With higher viscosity polyvinyl alcohols concentrations of less than 3% might be desirable, while with lower viscosity polyvinyl alcohols, a concentration of more than 7% might be employed.

The gels obtained in accordance with our invention may be used for various purposes. They may be used as carriers for silver halide wherever colored photographic emulsions are desired. They may also be used in the form of sheeting for safelights or for light filters in photographic apparatus. Other uses to which these gels may be put are subbing layers, overcoatings or backings for film, as adhesives, thickening agents or sizings for paper or cloth or for use in coating compositions. These gels particularly after they have been coated out into sheet form may be hardened such as by treating with formaldehyde, bichromates, chrome alum or diketones. If desired plasticizers may be incorporated with the gels particularly if the formation of flexible sheeting therefrom is contemplated. Some of the plasticizers which may be employed are glycol, glycerol or monoacetin.

As pointed out previously gels may be prepared using either polyvinyl alcohol or polyvinyl compounds containing a sufficent proportion of hydroxyl groups so as to be a polyvinyl alcohol for all practical purposes. The criterion as to whether a hydrolyzed polyvinyl ester may be employed as the polyvinyl alcohol is whether or not it is soluble in water. If the polyvinyl ester containing a large proportion of hydroxyl is soluble in water, a rigid opaque gel may be formed therefrom in accordance with our invention. All of the polyvinyl esters of the lower fatty acids containing at least 50% of vinyl alcohol are suitable for use as the starting material in our invention. These water-soluble polyvinyl esters, such as polyvinyl acetate may be prepared by hydrolyzing the polvinyl ester with hydrochloric acid and water as described in U. S. Patent No. 1,971,951 of Skirrow and Morrison until the resin has a vinyl alcohol content of at least 50%. It is to be noted that the gelled polyvinyl alcohol in accordance with our invention has advantages over natural products in that a resin of definite purity can be obtained and the treatment with gelling agent can be standardized in contrast to natural products whose properties may be fairly marked due to the difference in different batches of the material. Therefore, gelled polyvinyl alcohol in various uses lends itself to standardization in those processes.

We claim:

1. A firm, thermal-reversible gel composed of polyvinyl alcohol mixed with a gelling amount of an alkali-metal salt of an ortho-hydroxy benzal aromatic ketone.

2. A firm, thermal-reversible gel composed of polyvinyl alcohol mixed with a gelling amount of an alkali metal salt of o-hydroxybenzal acetophenone.

3. A firm, thermal-reversible gel composed of polyvinyl alcohol mixed with a gelling amount of an alkali-metal salt of disalicylal acetone.

4. A firm, thermal-reversible gel composed of polyvinyl alcohol mixed with a gelling amount of an alkali-metal salt of o-hydroxybenzal-o-hydroxyacetophenone.

5. A method of preparing a thermal-reversible gel which comprises mixing an aqueous solution of polyvinyl alcohol with a gelling amount of an alkali metal salt of an o-hydroxybenzal aromatic ketone at a temperature at which the mixture retains its liquid form, and subsequently lowering the temperature to the point at which the formation of a gel occurs.

6. A method of preparing a thermal-reversible gel which comprises mixing an aqueous solution of polyvinyl alcohol with a gelling amount of an alkali metal salt of o-hydroxybenzal acetophenone at a temperature at which the mixture retains its liquid form, and subsequently lowering the temperature to the point at which the formation of a gel occurs.

7. A method of preparing a thermal-reversible gel which comprises mixing an aqueous solution of polyvinyl alcohol with a gelling amount of an alkali metal salt of disalicylal acetone at a temperature at which the mixture retains its liquid form, and subsequently lowering the temperature to the point at which the formation of a gel occurs.

8. A method of preparing a thermal-reversible gel which comprises mixing an aqueous solution of polyvinyl alcohol with a gelling amount of an alkali metal salt of o-hydroxybenzal-o-hydroxyacetophenone at a temperature at which the mixture retains its liquid form, and subsequently lowering the temperature to the point at which the formation of a gel occurs.

WENDEL H. McDOWELL.
WILLIAM O. KENYON.